(12) United States Patent
Stevanovic et al.

(10) Patent No.: US 9,203,090 B2
(45) Date of Patent: Dec. 1, 2015

(54) METHOD OF MAKING A CATHODE SLURRY AND A CATHODE

(71) Applicant: The Gillette Company, Boston, MA (US)

(72) Inventors: Maya Stevanovic, Danbury, CT (US); Minkoo Kang, New Milford, CT (US)

(73) Assignee: The Gillette Company, Boston, MA (US)

( * ) Notice: Subject to any disclaimer, the term of this patent is extended or adjusted under 35 U.S.C. 154(b) by 179 days.

(21) Appl. No.: 14/153,626

(22) Filed: Jan. 13, 2014

(65) Prior Publication Data

US 2015/0200395 A1  Jul. 16, 2015

(51) Int. Cl.

| | |
|---|---|
| *H01M 2/00* | (2006.01) |
| *H01M 4/58* | (2010.01) |
| *B01F 3/12* | (2006.01) |
| *B01F 7/00* | (2006.01) |
| *H01M 4/04* | (2006.01) |
| *H01M 4/136* | (2010.01) |
| *H01M 4/1397* | (2010.01) |
| *H01M 4/62* | (2006.01) |

(Continued)

(52) U.S. Cl.
CPC .......... *H01M 4/5825* (2013.01); *B01F 3/1214* (2013.01); *B01F 7/00991* (2013.01); *H01M 4/0402* (2013.01); *H01M 4/0404* (2013.01); *H01M 4/136* (2013.01); *H01M 4/1397* (2013.01); *H01M 4/523* (2013.01); *H01M 4/622* (2013.01); *H01M 4/625* (2013.01); *H01M 10/052* (2013.01); *B01F 2003/125* (2013.01); *B01F 2215/0098* (2013.01); *H01M 2004/028* (2013.01)

(58) Field of Classification Search
CPC ..... H01M 4/136; H01M 4/523; H01M 4/622; H01M 4/625; H01M 10/052
USPC .......................................................... 429/163
See application file for complete search history.

(56) References Cited

U.S. PATENT DOCUMENTS

| 7,261,979 B2 | 8/2007 | Gozdz et al. |
| 7,799,461 B2 | 9/2010 | Gozdz et al. |

(Continued)

FOREIGN PATENT DOCUMENTS

| DE | 10 2008 041 319 | 2/2010 |
| EP | 1922781 A2 | 5/2008 |

OTHER PUBLICATIONS

Kwang Man Kim, Woo Sung Jeon, In Jae Chung, Soon Ho Chang. "Effect of mixing sequences on the electrode characteristics of lithium-ion rechargeable batteries." *Journal of Power Sources* 83 (1999) 108-113.

(Continued)

*Primary Examiner* — Milton I Cano
*Assistant Examiner* — Jimmy K Vo
(74) *Attorney, Agent, or Firm* — Leo J. White; Kevin C. Johnson; Steven W. Miller (57) ABSTRACT

A cathode slurry comprising organic solvent, lithium iron phosphate, polymeric binder, and at least one conductive agent, and from about 30 wt. % to about 40 wt. % solids is prepared. The cathode slurry may be coated onto at least one side of a substrate to form a cathode coated substrate. The cathode coated substrate may be dried to form a cathode. An anode and cathode may be contained within a housing with electrolyte to form a lithium ion cell.

13 Claims, 6 Drawing Sheets

(51) Int. Cl.
  *H01M 4/52* (2010.01)
  *H01M 10/052* (2010.01)
  *H01M 4/02* (2006.01)

(56) References Cited

U.S. PATENT DOCUMENTS

| | | |
|---|---|---|
| 8,080,338 B2 | 12/2011 | Gozdz et al. |
| 8,323,831 B2 | 12/2012 | Wilkins et al. |
| 2011/0117432 A1 | 5/2011 | Kay |
| 2011/0159360 A1* | 6/2011 | Hirota et al. .................. 429/206 |
| 2011/0300443 A1 | 12/2011 | He et al. |
| 2013/0216897 A1 | 8/2013 | Kim et al. |

OTHER PUBLICATIONS

PCT International Search Report with Written Opinion for corresponding international application PCT/US2015/010606 dated May 28, 2015.

* cited by examiner

METHOD OF MAKING A CATHODE SLURRY AND A CATHODE

FIELD OF THE INVENTION

Embodiments of the present disclosure generally relate to methods of making a cathode slurry and a cathode, and more specifically relate to methods of making a cathode slurry and a cathode for use in a lithium ion rechargeable battery.

BACKGROUND OF THE INVENTION

Lithium ion batteries are a type of rechargeable battery in which a lithium ion moves between a negative electrode and a positive electrode. A typical lithium ion battery may include a cathode, an anode, electrolyte, and a separator. In order to form the electrodes (cathode and anode), a slurry containing active material is coated on a collector followed by additional finishing steps to form the electrode. The degree of dispersion in slurry can play an important role in the performance of the electrodes and lithium ion batteries. In forming the cathode, poorly dispersed slurry could yield coating solution of locally non-uniform rheology within the bulk. The resulting uneven coating weight distribution during the coating process can cause decreased battery performance issues, such as slower transfer of energy into or out of the battery. For example, uneven coating of the cathode slurry onto the collector can occur. Also, the agglomeration of the particulate materials present in the slurry can cause quick clogging of filters used during the coating process resulting in increased downtime, as well as, pressure build-up upstream of the coating valve due to poor flow properties of the slurry.

Accordingly, alternative approaches for making a cathode slurry and a cathode are disclosed herein.

SUMMARY OF THE INVENTION

Disclosed in embodiments herein are methods for making a cathode slurry. The cathode slurry comprises organic solvent, lithium iron phosphate, polymeric binder, and at least one conductive agent. The cathode slurry further comprises from about 30 wt. % to about 40 wt. % solids. The methods comprise providing a premix comprising the lithium iron phosphate and the organic solvent, forming a polymer solution by admixing the polymeric binder and the organic solvent, admixing from about 50 wt. % to about 75 wt. % of the premix to the polymer solution to form a first mix, combining at least one conductive agent to the first mix to form a second mix, and admixing from about 25 wt. % to about 50 wt. % of the premix to the second mix to form the cathode slurry.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE INVENTION

Reference will now be made in detail to embodiments of methods of making a cathode slurry, examples of which are illustrated in the accompanying drawings. Whenever possible, the same reference numerals will be used throughout the drawings to refer to the same or like parts. In embodiments herein, disclosed are methods of making a cathode slurry. The cathode slurry comprises organic solvent, at least one cathode active material, for example lithium iron phosphate, polymeric binder, and at least one conductive agent. The methods comprise providing a premix comprising the at least one cathode active material, such as lithium iron phosphate, and organic solvent, forming a polymer solution by admixing polymeric binders and organic solvents, admixing from about 50 wt. % to about 75 wt. % of the premix to the polymer solution to form a first mix, combining at least one conductive agent to the first mix to form a second mix, and admixing from about 25 wt. % to about 50 wt. % of the premix to the second mix to form the cathode slurry.

As used herein, the term "combining" refers to components added together with or without substantial mixing towards achieving homogeneity. As used herein, the term "admixing" refers to adding components together with substantial mixing towards achieving homogeneity. Admixing may be performed by a mixer selected from the group consisting of shear mixers, planetary mixers, dispersers, rotary blade mixers, high intensity mixers, or combinations thereof.

In embodiments herein, the method may further comprise milling the premix using milling media. The milling media may be, for example, 1.5 mm diameter Yttria-stabilized Zirconia. In embodiments herein, the method may further comprise filtering the premix prior to admixing the premix to the polymer solution such that the premix has an average particle size of less than about 200 microns, less than about 150 microns, less than about 100 microns, or less than about 75 microns.

The cathode active material may be selected from lithium-based compounds, sodium-based compounds, and any mixture thereof. The lithium-based and sodium-based compounds may include one or more compounds selected from oxygen, phosphorous, sulphur, nitrogen, nickel, cobalt, manganese, vanadium, silicon, carbon, aluminum, niobium, zirconium and iron.

In some embodiments, the cathode active materials may include lithium-metal oxides. Examples of suitable lithium-metal oxides may include, but are not limited to, $LiCoO_2$, $LiNi_xMn_{2-x}O_4$, $Li(Ni_xCo_yAl_z)O_2$, $Li(Ni_xMn_yCo_z)O_2$, $aLi_2MnO_3 \cdot (1-a)Li(Ni_xMn_yCo_z)O_2$, and any mixture thereof wherein $0<a<1$, $0 \leq x \leq 1$, $0 \leq y \leq 1$, and $0 \leq z \leq 1$. Other suitable cathode active materials may include vanadium oxides.

In other embodiments, the cathode active material may comprise lithium-transition metal-phosphate, sodium-transition metal-phosphate, or any mixture thereof. The lithium-transition metal-phosphate and sodium-transition metal-phosphate compound may optionally be doped with a metal, metalloid, or halogen. The lithium-transition metal-phosphate and sodium-transition metal-phosphate may be an olivine structure compound, such as $LiMPO_4$ and $NaMPO_4$ where M is one or more of vanadium (V), chromium (Cr), manganese (Mn), iron (Fe), cobalt (Co), tin (Sn), niobium (Nb), molybdenum (Mo), zirconium (Zr), zinc (Zn), nickel (Ni), or any mixture thereof. An example of lithium-transition metal-phosphate having an olivine structure may be $LiFePO_4$. An example of sodium-transition metal-phosphate having an olivine structure may be $NaFePO_4$. The cathode active material may be optionally doped at the Li, M or O-sites. Deficiencies at the Li-site may be compensated by the addition of a metal or metalloid, and deficiencies at the O-site may be compensated by the addition of a halogen. In some embodiments, the cathode active material is a thermally stable, doped lithium transition metal phosphate having an olivine structure and having the formula $(Li_{1-x}Z_x)MPO_4$, wherein M is one or more of V, Cr, Mn, Fe, Co, and Ni, Z is a non-alkali metal dopant such as one or more of Sn, Zr, Nb, aluminum (Al), or magnesium (Mg), and x ranges from 0.005 to 0.05.

In embodiments herein, the cathode active material may be lithium iron phosphate. The lithium iron phosphate may be present in the cathode slurry in an amount ranging from about 30 wt. % to about 35 wt. %, from about 31 wt. % to about 34 wt. %, or from about 33 wt. % to about 34 wt. %. The lithium iron phosphate may also be present in the dry cathode in an amount ranging from about 75 wt. % to about 95 wt. %, from about 80 wt. % to about 95 wt. %, or from about 85 wt. % to about 95 wt. %.

Exemplary binder materials suitable for use within the slurry include polyvinylidene fluoride (PVDF)-based polymers, such as poly(vinylidene fluoride) (PVDF), and its co- and terpolymers with hexafluoroethylene, hexafluoropropylene, tetrafluoroethylene, chlorotrifluoroethylene, poly(vinyl fluoride), polytetraethylene (PTFE), ethylene-tetrafluoroethylene copolymers (ETFE), an acrylic copolymer, polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), styrene-ethylene-butylene-styrene (SEBS), polyimides, polyurethanes, polybutadiene, polyvinyl alcohol, sodium polyacrylic acid, polyacrylonitrile, and ethylene-vinyl acetate copolymers. Other polymeric binders may include polyethylene, polypropylene, polyamide, polyurethane, polyvinyl chloride, polyvinylidene fluoride, thermoplastic polyester resin, or combinations thereof.

In embodiments herein, the polymeric binder may be present in the cathode slurry in an amount ranging from about 0.5 wt. % to about 3.0 wt. %, from about 1.0 wt. % to about 2.5 wt. %, or from about 1.5 wt. % to about 2.0 wt. %. In further embodiments herein, the polymeric binder may be present in the dry cathode in an amount ranging from about 1 wt. % to about 10 wt. %, from about 2 wt. % to about 8 wt. %, or from about 4 wt. % to about 6 wt. %.

The conductive agent may be selected from carbon compounds, such as, for example, natural graphite, synthetic graphite, carbon black, acetylene black, partially graphitized coke, carbon nanotubes, fullerene, graphene, or any mixture thereof. The conductive agent may have a nano-structure and be, for example, a carbon nanotube structure. Examples of carbon nanotube structures may include single-walled carbon nanotubes (SWCNT), multi-wall carbon nanotubes (MWCNT), vapor-phase grown carbon fibers (VGCF), or any mixture thereof. The diameters of the various carbon nanotube structures may range from about 0.4-2 nm for SWCNT; from about 4 to 100 nm for MWCNT; and greater than about 100 nm for VGCF. In addition to these carbon based conductive agents, it is contemplated that other conductive metals may be used as conductive agents, for example, a tin conductive agent. In embodiments herein, the conductive agents may be present in the cathode slurry in an amount ranging from about 0.5 wt. % to about 3.0 wt. %, from about 0.75 wt. % to about 2.0 wt. %, or from about 1.2 wt. % to about 1.8 wt. %. In embodiments herein, the conductive agents may be present in the dry cathode in an amount ranging from about 1 wt. % to about 10 wt. %, from about 2 wt. % to about 8 wt. %, or from about 3 wt. % to about 5 wt. %.

The organic solvent may help insure that the at least one conductive agent is more effectively dispersed throughout the cathode slurry and may lead to a more efficient and higher-performing cathode. The organic solvent may be a polar polymeric compound, a surfactant, or a high viscosity liquid such as mineral oil or wax. Exemplary organic solvents may include polyvinylpyrrolidone (PVP), polystyrene sulfonate (PSS), polyphenylacetylene (PAA), poly-meta-phenylenevinylene (PmPV), polypyrrole (PPy), poly p-phenylene benzobisoxazole (PBO), natural polymers, amphiphilic materials in aqueous solutions, anionic aliphatic surfactant, sodium dodecyl sulfate (SDS), cyclic lipopeptide bio surfactant, surfactin, water-soluble polymers, polyvinyl alcohol (PVA), sodium dodecyl sulfate (SDS), polyoxyethylene surfactant, polyvinylidene fluoride (PVDF), carboxyl methyl cellulose (CMC), hydroxyl ethyl cellulose (HEC), polyacrylic acid (PAA), polyvinyl chloride (PVC), N-methylpyrrolidinone (NMP), gamma-butyrolactone, dimethylformamide, acetone, methyl ethyl ketone, or combinations thereof. In embodiments herein, the organic solvents may be present in the cathode slurry in an amount ranging from about 30 wt. % to about 50 wt. %, from about 35 wt. % to about 50 wt. %, or from about 38 wt. % to about 45 wt. %.

In embodiments herein, the organic solvents may be present in the cathode slurry in an amount ranging from about 30 wt. % to about 50 wt. %, from about 35 wt. % to about 50 wt. %, or from about 38 wt. % to about 45 wt. %.

In some embodiments, the cathode slurry comprises from about 30 wt. % to about 40 wt. % solids. In other embodiments, the cathode slurry comprises from about 30 wt. % to about 37 wt. % solids. In some embodiments, the solids may comprise from about 75 wt. % to about 95 wt. % of lithium iron phosphate, from about 1 wt. % to about 10 wt. % polymeric binder, and from about 1 wt. % to about 10 wt. % at least one conductive agent. In other embodiments, the solids may comprise from about 80 wt. % to about 95 wt. % or from about 85 wt. % to about 95 wt. % of lithium iron phosphate, from about 2 wt. % to about 8 wt. % or from about 4 wt. % to about 6 wt. % of polymeric binder, and from about 2 wt. % to about 8 wt. % or from about 3 wt. % to about 5 wt. % of at least one conductive agent.

Figure 1:
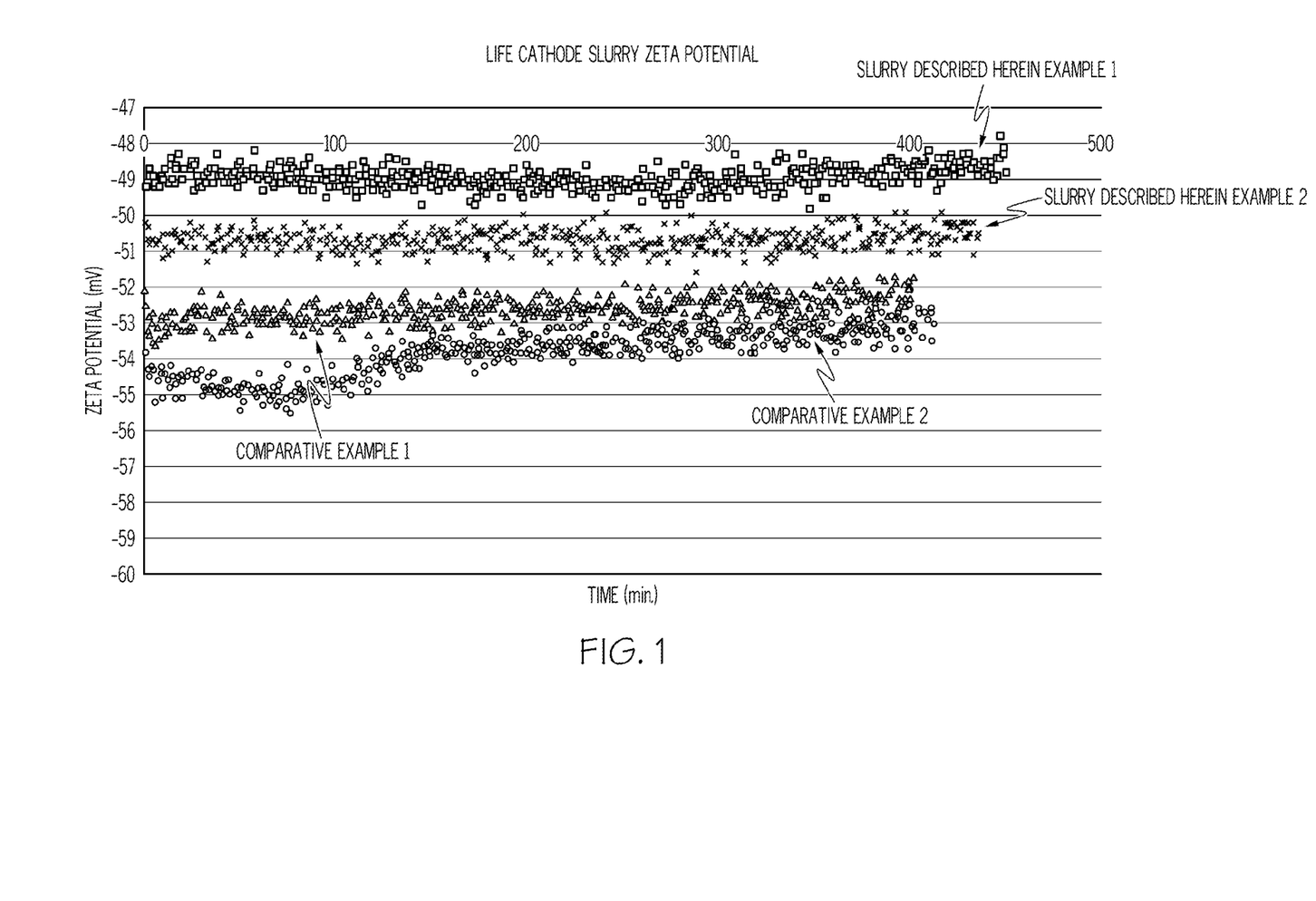
FIG. 1 graphically depicts a comparison of the zeta potential for a cathode slurry according to one or more embodiment shown and described herein.

In embodiments herein, the cathode slurry may be substantially free of grit. The term "substantially free," is used to describe the absence of a particular component in the cathode slurry composition (or any of the mixtures used to form the cathode slurry, including the premix, polymer solution, first mix and second mix), means that the component is present in the cathode slurry composition (or any of the mixtures used to form the cathode slurry) in a trace amount of less than 0.5 wt. %, or less than 0.1 wt. %. The term "grit" is used herein to describe the agglomeration of solid particulate material present in the cathode slurry (or any of the mixtures used to form the cathode slurry) to a size of greater than about 250 microns. It has been found that when a significant amount of grit is present in the slurry (or any of the mixtures used to form the cathode slurry), during a filtering process, the grit tends to clog the filter thereby raising the filter pressure. The elevated filter pressure can reduce the filter life making it operable for less than about 2 hours. Without being bound by theory, it is believed that the method of forming a cathode slurry and cathode described herein reduces the formation of grit by reducing dynamic re-agglomeration in the cathode slurry (or any of the mixtures used to form the cathode slurry) by increasing the dispersion stability, such that the filter can operate for greater than about 3 hours in some examples, greater than about 3.5 hours in other examples, or greater than about 4 hours in further examples. For example, increased dispersion stability is indicated by the increased absolute value of ζ potential (zeta potential), as shown in FIG. 1. FIG. 1 shows the ζ potential for cathode slurries as described herein, as well as comparative examples of conventionally prepared cathode mixtures.

In embodiments herein, combining the at least one conductive agent to the first mix may comprise admixing a first conductive agent, and admixing a second conductive agent after admixing the first conductive agent to the first mix. Of course, numerous conductive agents may be admixed to the first mix in sequential order or using other combinations, such as, for example, admixing a combination of first and second conductive agents to the first mix, followed by admixing a third conductive agent to the first mix or admixing a first conductive agent to the first mix, followed by admixing a combination of second and third conductive agents to the first mix.

Also disclosed herein, are methods of forming a cathode electrode comprising preparing a cathode slurry, e.g., a cathode slurry as described above, wherein the cathode slurry comprises from about 30 wt. % solids to about 37 wt. % solids. The method further comprises depositing the cathode slurry onto at least one side of a substrate to form a cathode coated substrate, and drying the cathode coated substrate to form a cathode. The cathode coated substrate is dried to remove solvents present in the cathode slurry.

Figure 2:
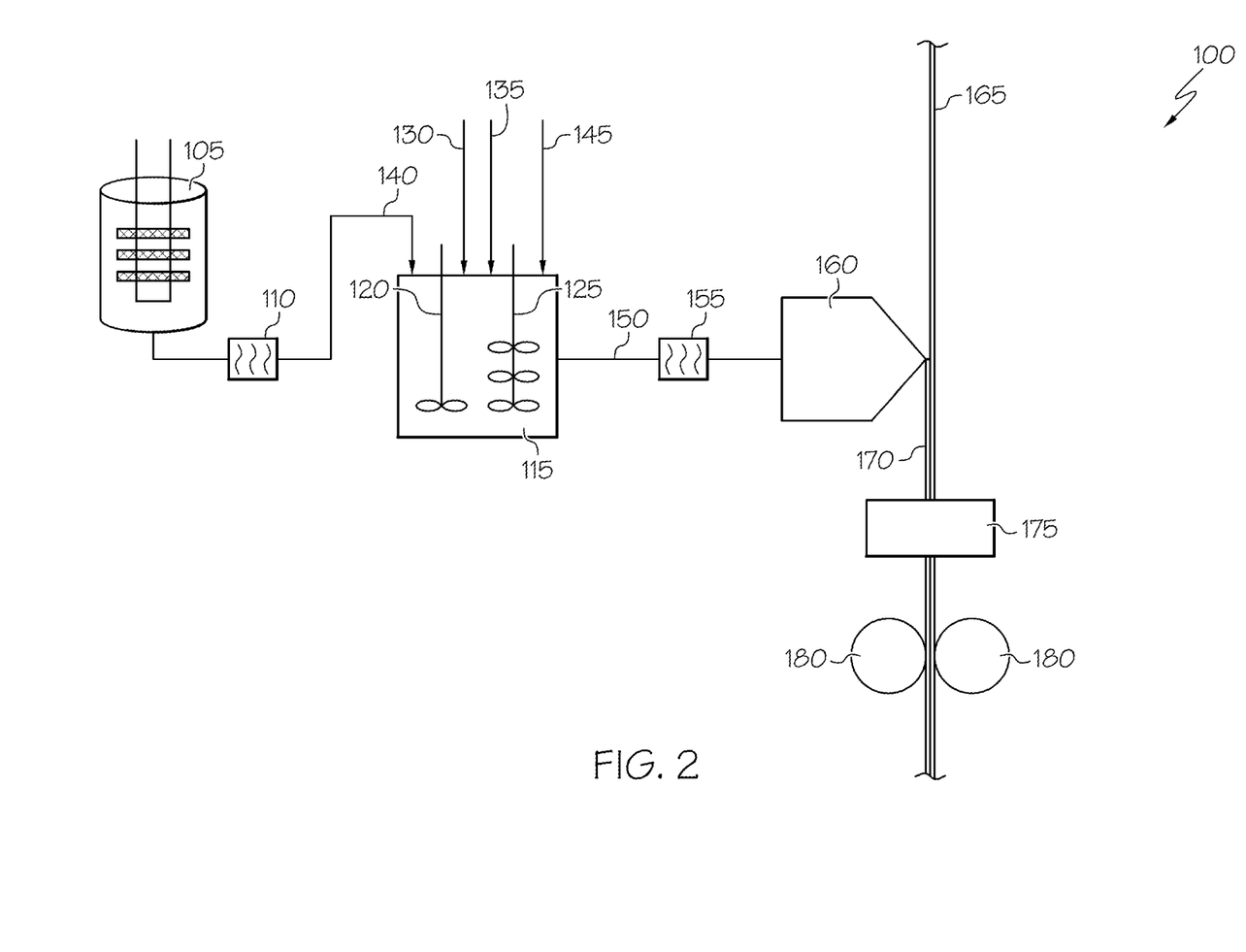
FIG. 2 schematically depicts a method of making a cathode according to one or more embodiments shown and described herein.

Referring to FIG. 2, depicted is an illustrative process (100) for forming a cathode. Lithium iron phosphate and organic solvent are combined to form a premix that is fed to a mill (105) where the premix is milled. The milled premix is then sent to a filter (110) to remove larger particles present in the premix. A double planetary mixer (115), having a planetary blade (120) and a disperser blade (125), is loaded with a polymeric binder (130) and organic solvent (135), which together form a polymer solution. The polymer solution may be mixed in the mixer (115) prior to the addition of additional ingredients. About 50 wt. % to about 75 wt. % of the premix (140) is added to the polymer solution present in the mixer (115) to form a first mix. The first mix may be mixed in the mixer (115) prior to the addition of additional ingredients. At least one conductive agent (145) is added to the first mix to form a second mix. The second mix may be mixed in the mixer (115) prior to the addition of additional ingredients. About 25 wt. % to about 50 wt. % of the premix may be added to the second mix to form the cathode slurry. The cathode slurry is mixed in the mixer (115). Mixing may be performed using the planetary blade (120) alone, the disperser blade (125) alone, or a combination of the two.

The cathode slurry (150) may then be pumped through an inline filter (155) and then to a coater (160) where the cathode slurry (150) is coated on one or more sides of a substrate (165). The cathode coated substrate (170) may then be dried in a dryer (175) to form a cathode.

The substrate may be a current collector. The current collector may be made of metal or other electrically-conductive material, such as nickel, copper, aluminum, titanium, or combinations thereof, as well as graphitized cloth, such as graphite foil. The current collector may be a thin, flat, sheet material, such as a foil. The current collector may have a thickness from about 5 μm to about 300 μm. The current collector thickness may be from about 8 μm to about 20 μm for metal foils and may be from about 100 μm to about 200 μm for graphite foils. Deposition of the cathode slurry onto a current collector may be performed using a coater selected from the group consisting of slot die coater, roll coater, reverse gravure, screen printer, or combinations thereof. The cathode slurry, in a wet state, may be deposited such that the cathode slurry has a thickness of from about 100 microns to about 500 microns, from about 150 microns to about 400 microns, or from about 200 microns to about 300 microns. The cathode slurry may further be deposited such that it has a relatively even thickness having a variance of less than about 20% across the surface, less than about 15% across the surface, or less than about 10% across the surface.

Still referring to FIG. 2, the cathode may further be calendered using calendering rolls (180) to compact the cathode. The cathode may then be cut to a desired width and length. A cathode may have an average thickness ranging from about 15 microns to about 150 microns, from about 25 microns to about 125 microns, or from about 35 microns to about 100 microns. A cathode may have an average thickness when coated on both sides of a current collector of about 109 microns to about 117 microns (including a primed substrate having a thickness of about 22 microns). A cathode may have an average thickness when coated on one side of a current collector of about 62 microns to about 72 microns. The cathode may further have a thickness variance of less than about 20 wt. %, about 10 wt. %, or about 5 wt. %.

Also disclosed herein, are methods of forming an electrochemical cell, such as a lithium ion cell. A lithium-ion cell may comprise a housing containing a cathode formed according to one or more methods disclosed herein, an anode, and an electrolyte in contact with the cathode and the anode. The lithium-ion cell may further include a cap and/or a separator. The separator may be positioned between and in ionic contact with the cathode and anode.

Figure 3:
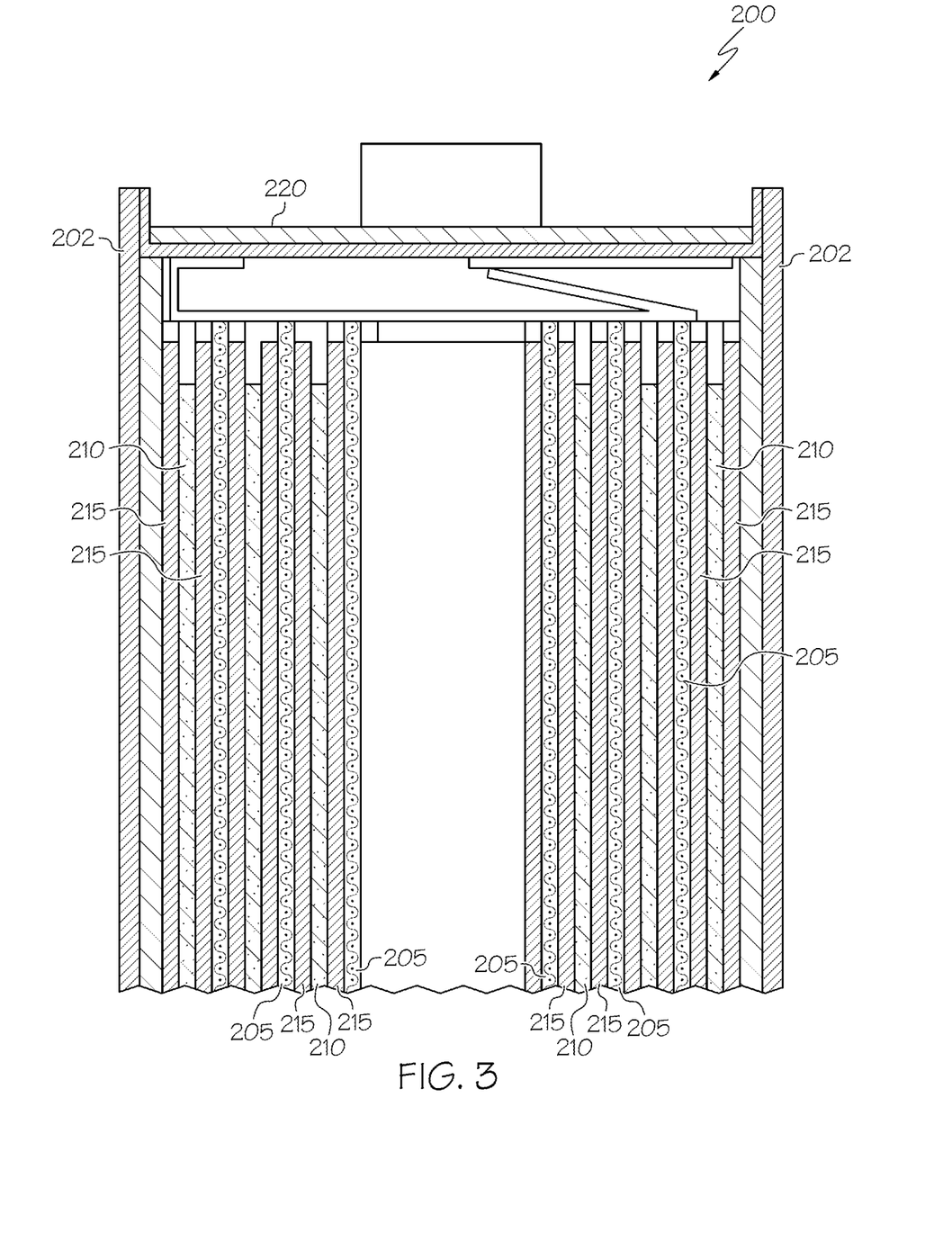
FIG. 3 schematically depicts a lithium ion cell comprising a cathode formed according to one or more embodiments shown and described herein.

Referring to FIG. 3, depicted is a cross-sectional view of the interior of an exemplary lithium-ion cell (200). The lithium-ion cell (200) comprises a housing (202), a cathode (205), an anode (210), and a separator (215) provided between the cathode (205) and anode (210). Also depicted is a cap (220). The lithium-ion cell (200) may be, for example, a cylindrical cell. It should be understood that other suitable shapes may be used. The lithium-ion cell (200) may be prepared by placing the anode (210), separator (215), and cathode (205) together to form an assembly such that the separator (215) is positioned between and in ionic contact with the anode and cathode. The assembly may be wound, rolled or folded together and placed in the housing (202). The housing (202) now containing the anode (210), the cathode (205), and the separator (215) may then be filled with electrolyte (not pictured) and subsequently hermetically sealed with, for example, a cap (220). The cap (220) may close and/or seal the lithium ion cell (200) using any suitable process. An insulator (225) is included between the housing (202) and the cap (220) to electrically isolate the housing (202) from the cap (220).

In some embodiments, the lithium-ion cell may be formed by preparing a cathode slurry by providing a premix comprising lithium iron phosphate and organic solvent, forming a polymer solution by admixing polymeric binder and organic solvent, admixing from about 50 wt. % to about 75 wt. % of the premix to the polymer solution to form a first mix, combining at least one conductive agent to the first mix to form a second mix, and admixing from about 25 wt. % to about 50 wt. % of the premix to the second mix to form the cathode slurry, wherein the cathode slurry comprises from about 30 wt. % solids to about 40 wt. % solids; forming a cathode using the cathode slurry; forming an anode; and positioning an electrolyte in contact with the cathode and anode such that a lithium ion cell is formed. The method may further comprise placing a separator between and in ionic contact with the cathode and anode.

The anode 12 may comprise at least one electrochemically active anode material. The anode material may be blended with at least one conductive additive and at least one binder material. The anode blend may be coated onto an electrically conductive support that may perform as an anode current collector.

The anode active material may be present in an amount of greater than about 75 wt. %, 85 wt. %, or 90 wt. %. The electrochemically active anode material may be selected from metallic lithium, lithium alloys, composite oxides of lithium, and any mixture thereof. The electrochemically active anode material may comprise silicon (Si), silicon alloys, tin (Sn), tin (Sn) alloys, lithium titanates (e.g., $Li_4Ti_5O_{12}$), and any mixture thereof. The electrochemically active anode material may also be selected from carbonaceous materials capable of inserting lithium into their structures. The carbonaceous material may be non-graphitic or graphitic. The carbonaceous material may be natural or synthetic carbon that is graphitized and may also be of a small particle size. Graphitic materials, such as natural graphite, spheroidal natural graphite, mesocarbon microbead, coke, mesophase carbon fiber, or any mixture thereof, may be generally preferred although non-graphitic carbon materials may be employed. The carbonaceous material may be graphite, fullerene, graphene, carbon nanotube, single-walled carbon nanotube (SWCNT), multi-wall carbon nanotube (MWCNT), vapor-phase grown carbon fiber (VGCF), or any mixture thereof. Carbonaceous anodes that include both silicon and lithium may also be utilized as anodic materials. Other electrochemically active anode materials may include lithium-alloying materials, intermetallics, silicon, and silicon-based compounds, such as silicon dioxide.

The binder may be present in an amount from about 1 wt. % to about 10 wt. %, from about 2 wt. % to about 8 wt. %, or from about 4 wt. % to about 6 wt. %, and can include, for example, polyvinylidene fluoride (PVDF)-based polymers, such as poly(vinylidene fluoride) (PVDF), and its co- and terpolymers with hexafluoroethylene, hexafluoropropylene, tetrafluoroethylene, chlorotrifluoroethylene, poly(vinyl fluoride), polytetraethylene (PTFE), ethylene-tetrafluoroethylene copolymers (ETFE), an acrylic copolymer, polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), styrene-ethylene-butylene-styrene (SEBS), polyimides, polyurethanes, polybutadiene, polyvinyl alcohol, sodium polyacrylic acid, polyacrylonitrile, and ethylene-vinyl acetate copolymers. Other polymeric binders may include polyethylene, polypropylene, polyamide, polyurethane, polyvinyl chloride, polyvinylidene fluoride, thermoplastic polyester resin, or combinations thereof.

In embodiments herein, the anode may further comprise conductive agents in an amount ranging from about 0.1 wt. % to about 10 wt. %, from about 0.25 wt. % to about 5 wt. %, or from about 0.5 wt. % to about 2 wt. %. Examples of suitable conductive agents may include, but are not limited to, natural graphite, artificial graphite, carbon black, acetylene black, partially graphitized coke, carbon fiber (e.g., vapor grown carbon fiber), carbon nanotubes, fullerenic carbon nanotube, vitreous carbon, carbon fiber, graphene, or combinations thereof. In embodiments herein, the anode may further comprise an adhesion promoter, to improve adhesion of the anode active material to a current collector, in an amount of less than about 2 wt. %, about 1 wt. % or about 0.5 wt. %. Examples of suitable adhesion promoters may include, but is not limited to, oxalic acid, adipic acid, formic acid, acrylic acid and itaconic acid, and derivatives thereof.

The anode active material and binder can be mixed to form an anode slurry which can be deposited, for example, to at least one side of a substrate, and dried to form an anode coated substrate. Like the cathode, the current collector may be made of metal or other electrically-conductive material, such as nickel, copper, aluminum, titanium, and combinations thereof, as well as graphitized clothes, such as graphite foil. The current collector may be a thin, flat, sheet material, such as a foil. The current collector may have a thickness from about 5 μm to about 300 μm. The current collector thickness may be from about 8 μm to about 20 μm for metal foils and may be from about 100 μm to about 200 μm for graphite foils. Deposition of the anode slurry onto the substrate may be performed using a coater selected from the group consisting of slot die coater, dip coater, spray coater, roll coater, screen printer, or combinations thereof. The anode coated substrate may further be calendered to further compact the anode, and then cut to a desired width and length. An anode coated on one side of a substrate may have an average thickness ranging from about 15 microns to about 150 microns, from about 25 microns to about 125 microns, or from about 35 microns to about 100 microns.

The electrolyte can be in liquid, solid or gel (polymer) form. The electrolyte comprises at least one salt dissolved in at least one organic solvent. The salt may comprise lithium. The salt may be at least one compound selected from the group consisting of lithium perchlorate ($LiClO_4$), lithium hexaflurophosphate ($LiPF_6$), lithium tetrafluorooxalatophosphate ($LiPF_4(C_2O_4)$), lithium tetrafluoroborate ($LiBF_4$), lithium trifluorsulfonate ($LiSO_3CF_3$), lithium trifluorsulfonimide ($LiN(SO_2CF_3)_2$), $LiN(SO_2CF_2CF_3)_2$ (LiBETi), lithium bis(oxalato)borate (LiBOB), lithium hexafluoroarsenate ($LiAsF_6$), lithium fluorsulfoneimide (LiFSI), and any mixture thereof. The salt may comprise salts containing the sodium cation, such as sodium perchlorate ($NaClO_4$), sodium trifluorsulfonimide (NaTFSI), sodium trifluorsulfonate (NaTFS), or any mixture thereof. The salt may be at a concentration within the electrolyte from about 0.5M to about 1.8M, or more specifically about 1.3M.

The organic solvent may be at a concentration from about 0.5, 1.0, 5.0 or 10 to about 30, 55, 75 or 95 weight percent of the electrolyte solution. The organic solvent may be at least one selected from the group consisting of ethylene carbonate (EC), propylene carbonate (PC), butylene carbonate (BC), dimethyl carbonate (DMC), ethyl methyl dicarbonate (EMC), diethyl carbonate (DEC), and their chlorinated or fluorinated derivatives as well as dipropyl carbonate, methyl propyl carbonate, ethyl propyl carbonate, dibutyl carbonate, butylmethyl carbonate, butylethyl carbonate, butylpropyl carbonate, or any mixture thereof.

The electrolyte may also comprise an electrolyte additive. The electrolyte additive may comprise at least one of propane sultone (PS), vinylene carbonate (VC), succinonitrile (SN), cyclohexylbenzene (CHB), tetra ethyl orthosilicate (TEOS), lithium bis(oxalato)borate (LiBOB), tetramethoxy titanium (TMTi), dimethyl acetamide (DMAc), lithium perchlorate ($LiClO_4$), propargyl methane sulfonate (PMS), or any mixture thereof. The electrolyte additive may be at a concentration from about 0.05, 1.5, or 2 weight percent to about 4, 4.5, or 5 weight percent of the electrolyte solution.

The separator can be formed of any of the standard separator materials used in electrochemical cells (e.g., lithium cells). In some embodiments, the separator can be formed of polyethylene, polypropylene (e.g., nonwoven polypropylene or microporous polypropylene), polytetrafluoroethylene, a polyamide (e.g., a nylon), a polysulfone, a polyvinyl chloride, polyvinylidene, poly(vinylidene fluoride), or combinations thereof. The separator may also include inorganic filler material, such as $Al_2O_3$, $SiO_2$, and $TiO_2$. Separators that include such inorganic filler material may have application, for example, within automotive applications of batteries. Another category of separators produced from microfibers, such as by melt-blown nonwoven film technology, may also be useful. In addition, the separator may be formed in situ to the battery. The separator can have a thickness of from about 5 microns to about 75 microns, from about 5 microns to about 50 microns, from about 5 microns to about 35 microns, from about 5 microns to about 30 microns, from about 8 microns to about 28 microns, from about 10 microns to about 26 microns, or from about 12 microns to about 24 microns.

The housing can be any standard housing used in electrochemical cells. In some embodiments, the housing may be formed from a metal or a metal alloy, such as nickel, nickel plated steel, stainless steel, aluminum-clad stainless steel, aluminum, or an aluminum alloy. In other embodiments, the housing may be formed from a plastic, such as polyvinyl chloride, polypropylene, a polysulfone, acrylonitrile butadiene styrene (ABS), or a polyamide. The housing may be formed into any shape used in electrochemical cells, such as a cylindrical shape, a prismatic shape, or a flexible pouch shape. The cap (220) is configured to close the open end of a lithium-ion cell, and can be formed from materials similar to the housing. The insulator (225) may be prepared by injection molding a polymer, such as polyamide, polypropylene, polyetherurethane, or the like; a polymer composite; and mixtures thereof into a shape with predetermined dimensions sufficient to mate with the cap (220).

Applicants have unexpectedly found that the electrochemical cells disclosed herein achieve better performance due to a lowered through resistance and charge transfer resistance, and an improved charge/discharge rate. Without being bound by theory, it is believed that the electrochemical cell performance is due to the cathodes formed according to one or more embodiments described herein. Specifically, it is believed that the methods described herein reduce the particle aggregation within the cathode slurry, and in particular, reduce the particle aggregation of the conductive agents within the slurry. The cathode through resistance may be measured by applying a pressure of about 2.61 kg/cm² to a cathode for 10 seconds, and then take a resistance measurement with a milliohmmeter.

The embodiments described herein may be further illustrated by the following non-limiting examples.

EXAMPLES

Comparative Lithium-Ion Cell

A cathode slurry premix was prepared by adding 7500 grams of lithium iron phosphate (the Life Power® P2 grade produced by Phostech Lithium Inc.) and 7500 grams of N-methylpyrrolidinone ("NMP") to a bottle containing 1.5 mm diameter Yttria-stabilized Zirconia used as the milling media. The premix was milled for about 75 to 90 minutes, filtered using a 100 micron filter, and stored overnight.

A cathode slurry was prepared by adding 4808 grams of PVDF (KUREHA 7208, KUREHA America, Inc., NY, NY) and 77.4 grams of carbon black (Denka Black from DENKA Corp., Japan) to a planetary mixer, and mixed at 25 RPM for five minutes, and then mixed under vacuum for one hour using a planetary mixer with disperser having a planetary blade speed of 25 RPM and a dispersion blade speed of 1000 RPM. Next, 231.5 g] of electroconductive carbon black were added to the slurry and the mixture was mixed at 25 RPM for five minutes, and then mixed under vacuum for one hour using the planetary mixer with disperser having a first blade speed of 25 RPM and second blade speed of 1000 RPM. 7000 grams of premix was added to the slurry and then mixed under vacuum for a half hour using the planetary mixer with disperser having a planetary blade speed of 25 RPM and a dispersion blade speed of 1000 RPM. Another 7000 grams of the premix was added to the slurry and then mixed for under vacuum for one hour using the planetary mixer with disperser having a planetary blade speed of 25 RPM and a dispersion blade speed of 1000 RPM. Finally, 1676 g of NMP was added to the mixture and was mixed overnight under vacuum using the planetary mixer with disperser having a planetary blade speed of 25 RPM and a dispersion blade speed of 1000 RPM.

The cathode slurry was coated onto both sides of a foil substrate, dried, and then calendered to form a cathode having a thickness of from about 109 microns to about 117 microns. The cathode was cut to its proper dimension in order to form a pouch cell.

An anode mixture was prepared by mixing for 2 hours at 25/300 rpm about 94.0 wt. % graphite (CONOCOPHILLIPS CREME G5), about 4.9 wt. % of PVDF (KUREHA 9300, KUREHA America, Inc., NY, NY), about 1.0 wt. % of vapor grown carbon fiber, and about 0.1 wt. % of oxalic acid. To the 100% of anode mixture, about 20% additional NMP was then added and mixed for about 1 hour at 25/1000 rpm to form an anode slurry. The anode slurry was coated onto both sides of a foil substrate, dried, and calendered to form an anode having a thickness of from about 38 microns to about 48 microns. The anode was cut to its proper dimension in order to form a pouch cell. The cathode and anode were formed into a pouch cell with a piece of separator (commercially available from Toray Industries, Inc. of Japan) placed between the two electrodes. The pouch cell was filled with an electrolyte solution (PUROLYTE, commercially available from NOVOLYTE Technologies). Four comparative pouch cells were prepared for testing.

Lithium-Ion Cells as Described Herein

A cathode slurry premix was prepared as described in the comparative example, except that the premix was not stored overnight, but was immediately used to prepare a cathode slurry.

A cathode slurry was prepared by adding 4808 g of PVDF (KUREHA 7208) and 1676 g of NMP to a planetary mixer, and mixed at 25 RPM for five minutes. 9000 grams of premix were added to the slurry and then mixed for five minutes at 25 RPM and then under vacuum for a half hour using a planetary mixer with disperser having a planetary blade speed of 25 RPM and a dispersion blade speed of 1000 RPM. 77.4 g of carbon black (Denka Black) were added to the slurry and then mixed for five minutes at 25 RPM and then under vacuum for a half hour using a planetary mixer with disperser having a planetary blade speed of 25 RPM and a dispersion blade speed of 1000 RPM. Next, 231.5 g of electroconductive carbon black were added to the slurry and the mixture was mixed at 25 RPM for five minutes, and then mixed under vacuum for a half hour using the planetary mixer with disperser having a planetary blade speed of 25 RPM and a dispersion blade speed of 1000 RPM. Finally, 5000 grams of the premix were added to the slurry, and the slurry was then mixed at 25 RPM for five minutes, and then overnight under vacuum using the planetary mixer with disperser having a planetary blade speed of 25 RPM and a dispersion blade speed of 1000 RPM.

Figure 4:
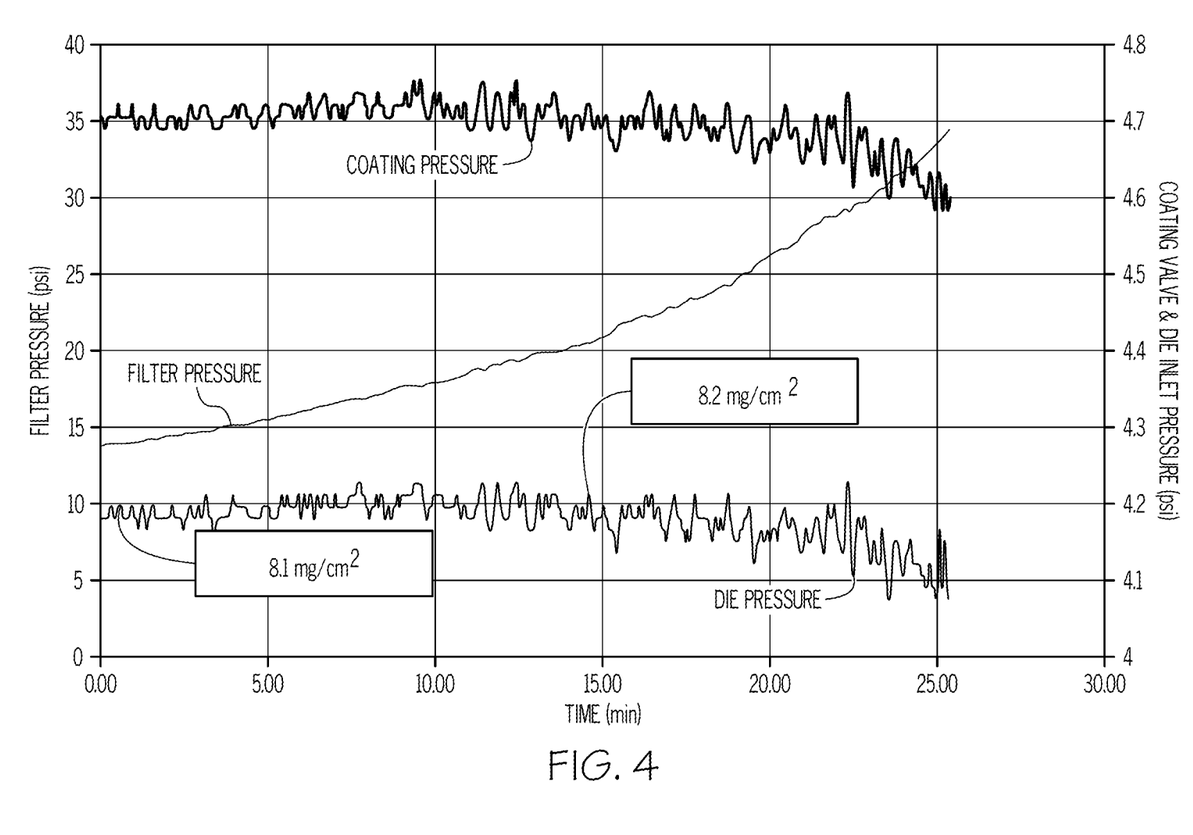
FIG. 4 graphically depicts a comparison of the filter pressure for a cathode slurry prepared according to one or more embodiments shown and described herein.

The cathode slurry was coated onto both sides of a foil substrate. A slot die coater and an inline filter were used during the coating operation. Referring to FIG. 4, depicted is the filter pressure for the inline filter over a 4 hour time period, with the last 25 minutes of the four hour period shown. Also depicted is the coating valve pressure and die inlet pressure over the same time period. When used to filter the cathode slurry, the filter is shown being operational for about a four hour period with the filter pressure only increasing in the last 25 minutes of operation. Also, the coating valve pressure and die inlet pressure is shown only decreasing towards the end of the four hour period. The cathode coated substrate was dried, and then calendered to form a cathode having a thickness of from about 109 microns to about 117 microns. The cathode was cut to its proper dimension in order to form a pouch cell. Table I provides a breakdown of the slurry composition and the resulting cathode composition.

TABLE I

| Slurry | Wt. % | Dry cathode | Wt. % |
|---|---|---|---|
| LiFePO$_4$ | 33.7% | LiFePO$_4$ | 91.0% |
| Carbon Black | 0.4% | Carbon Black | 1.0% |
| Electro-conductive Carbon Powder | 1.1% | Electro-conductive Carbon Powder. | 3.0% |
| Polyvinylidene fluoride binder | 1.8% | Polyvinylidene fluoride binder | 5.0% |
| 1-Methyl-2-pyrrolidinone solvent | 41.7% | 1-Methyl-2-pyrrolidinone solvent | — |
| % Slurry solids | 37.0% | | |

An anode was prepared as described in the comparative example. The cathode and anode were formed into a pouch cell with a piece of separator (commercially available as E20MMS from Tonen Chemical) placed between the two electrodes. The pouch cell was filled with an electrolyte solution (commercially available as PUROLYTE Electrolyte 0036 from NOVOLYTE Technologies). Four inventive pouch cells were prepared.

Figure 5:
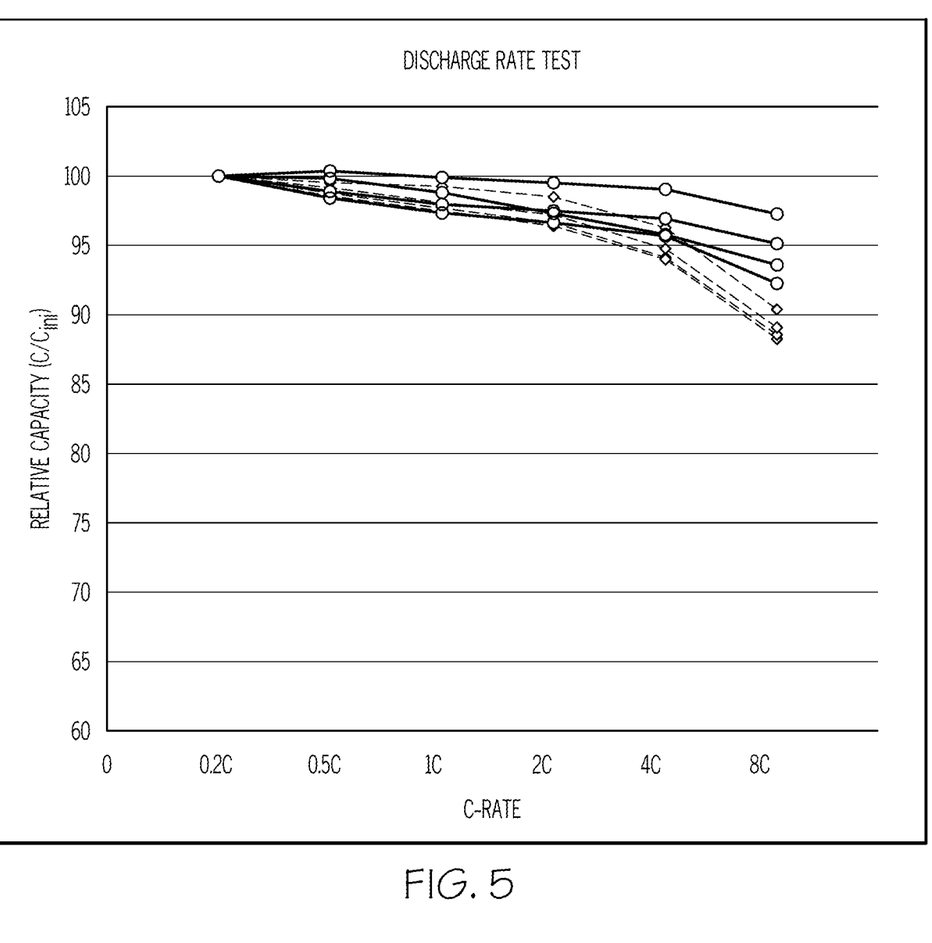
FIG. 5 graphically depicts a comparison of the relative battery capacity versus discharge rate for lithium ion cells using a $LiFePO_4$ cathode according to one or more embodiments shown and described herein or a conventionally formed $LiFePO_4$ cathode.

Referring to FIG. 5, depicted is a comparison of the relative battery capacity versus discharge rate for four comparative pouch cells of conventionally prepared cathode mixtures (shown with dashed lines) and four pouch cells as described herein (shown with solid lines). The relative battery capacity provides a measure of the quantity of current that will complete discharge from 100% to 0% for one hour. All cells underwent discharge cycles employing different discharge rates (C) of 0.2C, 0.5C, 1C, 2C, 4C and 8C. The charge current ($C_{ini}$) remained the same at 1C. Ten minute rest intervals were taken between each charge and discharge. As shown, the four inventive pouch cells have a higher relative battery discharge capacity as compared to the comparative pouch cells.

Figure 6:
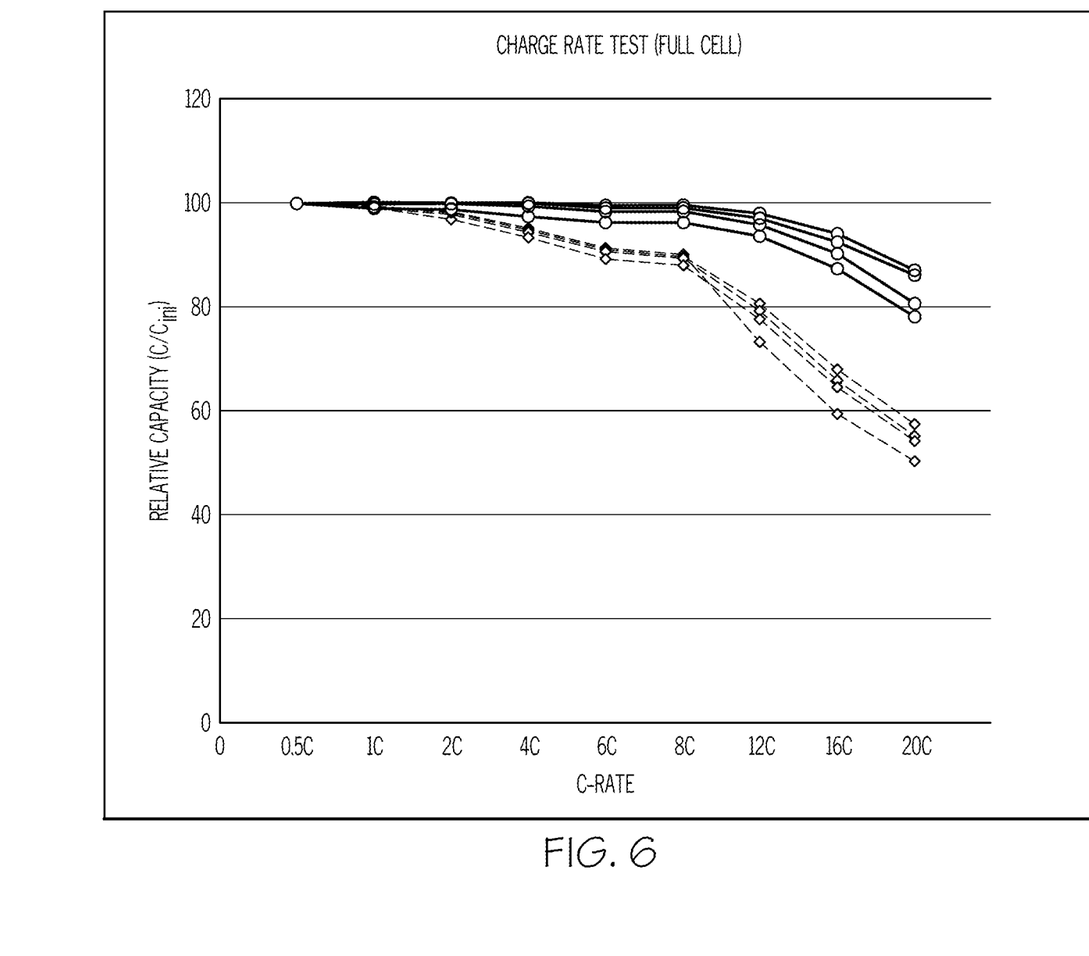
FIG. 6 graphically depicts a comparison of the relative battery capacity versus charge rate for lithium ion cells using a $LiFePO_4$ cathode according to one or more embodiments shown and described herein or a conventionally formed $LiFePO_4$ cathode.

Referring to FIG. 6, depicted is a comparison of the relative battery capacity versus charge rate for four comparative pouch cells of conventionally prepared cathode mixtures (shown with dashed lines) and four pouch cells as described herein (shown with solid lines). The relative battery capacity provides a measure of the quantity of current that will complete charge of the battery from 0% to 100% for one hour. All cells underwent charge cycles employing different charge rates (C) of 0.5C, 1C, 2C, 4C, 6C, 8C, 12C, 16C, and 20C. The discharge current ($C_{ini}$) remained the same at 0.5C. Ten minute rest intervals were taken between each charge and discharge. As shown, the four inventive pouch cells have a higher relative battery charge capacity as compared to the comparative pouch cells.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention. For example, two cathode active segments may be formed. The top of one of the cathode active segments may be placed adjacent to the bottom of the other cathode active segment. A separator may then be affixed along the cathode mating surfaces of the cathode active segments to form a first cathode active segment for use within a cathode assembly.

What is claimed is:

1. A method of making a cathode slurry comprising organic solvent, lithium iron phosphate, polymeric binder, and at least one conductive agent, the cathode slurry comprising from about 30 wt. % to about 40 wt. % solids, the method comprising:
providing a premix comprising the lithium iron phosphate and the organic solvent;
forming a polymer solution by admixing the polymeric binder and the organic solvent;
admixing from about 50 wt. % to about 75 wt. % of the premix to the polymer solution to form a first mix;
combining at least one conductive agent to the first mix to form a second mix; and admixing from about 25 wt. % to about 50 wt. % of the premix to the second mix to form the cathode slurry.

2. The method of claim 1, wherein the method further comprises filtering the premix prior to admixing the premix to the polymer solution such that the premix has an average particle size of less than about 150 microns.

3. The method of claim 1, wherein combining of the at least one conductive agent to the first mix comprises admixing a first conductive agent, and admixing a second conductive agent after admixing the first conductive agent to the first mix.

4. The method of claim 1, wherein the cathode slurry is substantially free of grit.

5. The method of claim 1, wherein the cathode slurry comprises from about 30 wt. % to about 37 wt. % solids.

6. The method of claim 1, wherein the solids comprise from about 75 wt. % to about 95 wt. % of lithium iron phosphate, from about 1 wt. % to about 10 wt. % of the polymeric binder, and from about 1 wt. % to about 10 wt. % of the at least one conductive agent.

7. The method of claim 1, wherein the polymeric binder is selected from the group consisting of polyvinylidene difluoride (PVDF)-based polymers, polytetrafluoroethylene (PTFE), an acrylic copolymer, carboxymethyl cellulose, styrene-butadiene rubber (SBR), polybutadiene, polyvinyl alcohol, sodium polyacrylic acid, polyacrylonitrile, and combinations thereof.

8. The method of claim 1, wherein the at least one conductive agent is selected from the group consisting of natural graphite, synthetic graphite, carbon black, acetylene black, partially graphitized coke, carbon nanotubes, fullerene, graphene, and combinations thereof.

9. The method of claim 1, wherein admixing is performed by a mixer selected from the group consisting of shear mixers, planetary mixers, dispersers, rotary blade mixers, high intensity mixers, and combinations thereof.

10. A method of forming a cathode, the method comprising:
preparing a cathode slurry according of claim 1, wherein the cathode slurry comprises from about 30 wt. % to about 37 wt. % solids;
depositing the cathode slurry onto at least one side of a substrate to form a cathode coated substrate; and
drying the cathode coated substrate to form the cathode.

11. The method of claim 10, wherein depositing is performed by a coater selected from the group consisting of slot die coater, roll coater, reverse gravure, screen printer, and combinations thereof.

12. The method of claim 10, wherein the cathode has an average thickness ranging from about 15 microns to about 150 microns.

13. The method of claim 12, wherein the cathode has a thickness variance across the cathode surface of less than 10 wt. %.

* * * * *